United States Patent [19]

Price-Falcon et al.

[11] 4,261,734
[45] Apr. 14, 1981

[54] METHOD OF MAKING SPONGE IRON

[75] Inventors: Juan F. Price-Falcon, Garza Garcia; Enrique R. Martinez-Vera, Monterrey, both of Mexico

[73] Assignee: Hylsa, S.A., Monterrey, Mexico

[21] Appl. No.: 72,412

[22] Filed: Sep. 4, 1979

[51] Int. Cl.³ .......................................... C21B 13/02
[52] U.S. Cl. ...................................................... 75/35
[58] Field of Search ...................................... 75/34, 35

[56] References Cited

U.S. PATENT DOCUMENTS

| | | | |
|---|---|---|---|
| 3,827,879 | 8/1974 | Celada et al. | 75/35 |
| 4,046,557 | 9/1977 | Beggs | 75/35 |
| 4,150,972 | 4/1979 | Price-Falcon | 75/35 |
| 4,160,663 | 7/1979 | Hsieh | 75/35 |

*Primary Examiner*—M. J. Andrews
*Attorney, Agent, or Firm*—Curtis, Morris & Safford

[57] ABSTRACT

A method for the gaseous reduction of iron ore to sponge iron in a vertical moving bed reactor having a reduction zone in the upper portion thereof and a cooling zone in the lower portion thereof which comprises using a coolant gas containing up to about 30% by volume of hydrocarbon, e.g., coke oven gas, and passing a mixture of the hydrocarbon-containing gas and steam through the cooling zone to cause the sponge iron therein to catalyze the conversion of the hydrocarbon/steam mixture to carbon monoxide and hydrogen.

18 Claims, 1 Drawing Figure

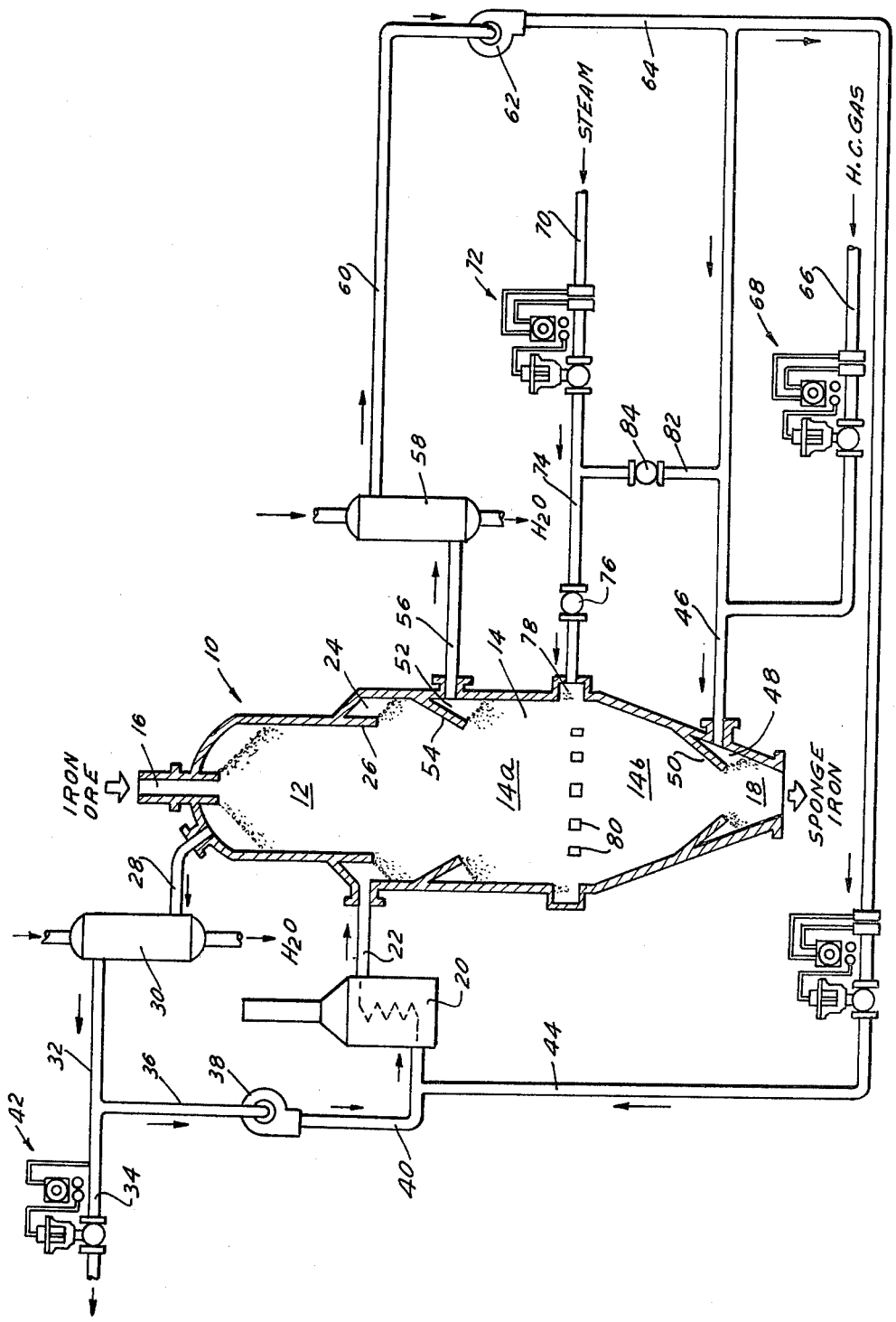

METHOD OF MAKING SPONGE IRON

This invention relates to the gaseous reduction of iron ore in a vertical shaft moving bed reactor to form sponge iron, and more particularly, to a novel method of using a hydrocarbon-containing gas, especially coke oven gas, as a source of reducing units in such a gaseous reduction process.

Typical gaseous reduction systems incorporating vertical shaft, moving bed iron ore reduction reactors are disclosed in U.S. Pat. Nos. 3,765,872; 3,770,421; 3,779,741; and 3,816,102. In such systems reduction of the ore has commonly been effected by a reducing gas largely composed of carbon monoxide and hydrogen prepared in any suitable manner by catalytic reformation of a mixture of natural gas and steam. Such systems typically comprise a vertical shaft reactor having a reducing zone in the upper portion thereof and a cooling zone in the lower portion thereof. The ore to be reduced is fed to the top of the reactor and flows downwardly therethrough, first through the reducing zone wherein it is brought into contact with heated reducing gas and then through a cooling zone where it is cooled by a gaseous coolant before being removed at the bottom of the reactor. Effluent gas from the reducing zone is cooled to remove water therefrom and in most cases a major part of the cooled effluent gas is reheated and recycled to the reducing zone. Similarly, at least a part of the coolant gas withdrawn from the cooling zone is commonly cooled and recycled to the cooling zone. At its lower end the reactor is provided with some means for controlling the discharge of the cooled sponge iron from the reactor, e.g., a rotary discharge valve, a vibratory chute, conveyor belt, or the like.

It has recently been found advantageous to utilize the sponge iron produced in such a reactor as a part of the feed to a blast furnace. By using sponge iron as a part of the blast furnace feed, the productivity of the furnace can be increased and the coke requirement of the furnace can be reduced. Thus significant economies in blast furnace operations can be achieved in this way.

Since blast furnaces use coke both as a fuel and as a reducing agent and in substantial amounts, they are commonly located near a battery of coke ovens that produce both coke and by-product coke oven gas containing reducing constituents. In cases where sponge iron is to be used as part of the blast furnace feed, it would be economically advantageous to integrate the sponge iron plant with the blast furnace and the coke plant, i.e., to locate the sponge iron production unit near the blast furnaces. Such physical juxtaposition of the sponge iron plant and blast furnaces would provide a number of advantages. Thus the amount of handling of the product sponge iron and the need for cooling the product sponge iron would be decreased.

A further potential advantage of such an integrated plant is the possibility of utilizing the by-product coke oven gas as a source of reducing constituents for the gaseous ore reduction reactor. One problem involved in this approach arises out of the fact that raw coke oven gas is not a very effective reducing agent for iron ore. While it is possible to treat the coke oven gas to improve its reducing effectiveness by, for example, a catalytic reforming process, the existing catalytic reformers require a sizeable capital investment that substantially increases the cost of the treated gas. Also coke oven gas has a relatively high sulfur content which adversely affects the catalysts usually employed in known catalytic reformers. Hence if the coke oven gas is to be reformed in a known type of catalytic reformer, the sulfur content of the gas must first be reduced to a very low level. Thus a need exists for an improved method of upgrading the reducing effectiveness of raw coke oven gas.

It is accordingly an object of the present invention to provide a novel method of reforming a gas containing a substantial proportion of hydrocarbon, e.g., coke oven gas, to increase its effectiveness as an iron ore reducing agent. It is another object of the invention to provide a novel method of reforming a gas containing a hydrocarbon, e.g., coke oven gas and the like, to form a mixture comprising substantial amounts of carbon monoxide and hydrogen. It is a further object of the invention to provide a method of iron ore reduction that facilitates integration of a sponge iron production plant with one or more blast furnaces and a battery of coke ovens to achieve an overall increase in the productivity of the blast furnaces and improvement in fuel economy. It is a still further object of the invention to eliminate the need for a separate catalytic gas reformer for upgrading the reducing effectiveness of a gaseous hydrocarbon, especially coke oven gas. Other objects of the invention will be in part obvious and in part pointed out hereafter.

The objects of the present invention are achieved in general by utilizing a vertical shaft, moving bed reactor wherein the cooling zone is used not only to cool and carburize the sponge iron as in previous systems, but also as an area for reforming a mixture of steam and hydrocarbon-containing gas. In accordance with the invention a cooling loop is established including the cooling zone of the reactor, and steam and a hydrocarbon-containing gas, usually a methane-containing gas, are either fed to separate points in the cooling loop or pre-mixed and fed as a mixture to the cooling loop. The sponge iron within the cooling zone is used as a catalyst to effect a reformation of the gaseous hydrocarbon in the gas/steam mixture and the resulting reformed gas is then used as a source of reducing gas for the reduction zone of the reactor. It has been found that the feed coke oven gas need not be completely de-sulfurized in the present process since deposition of sulfur on the sponge iron in the cooling zone does not adversely affect its activity and in any event the sponge iron forms a continually renewed catalyst mass. The amount of sulfur deposited on the sponge iron can readily be adjusted during the subsequent steel-making step. The the de-sulfurizing cost is reduced with the present process.

Desirably the gas mixed with the steam contains up to about 30% by volume of methane or other hydrocarbon gas. If higher proportions of hydrocarbon are used, excessive deposition of carbon on the sponge iron may occur.

The objects and advantages of the present invention can best be understood and appreciated by reference to the accompanying drawing which illustrates a direct gaseous reduction system adapted to be used in carrying out a preferred embodiment and a modification of the invention.

Referring to the drawing, the numeral 10 generally designates a vertical shaft, moving bed reduction reactor having a reduction zone 12 in the upper portion thereof and a cooling zone 14 divided into an upper section 14a and lower section 14b in the lower portion of the reactor. Iron ore to be reduced enters the top of the reactor through an inlet 16 and flows downwardly through the reduction zone 12 wherein it is reduced by upwardly flowing hot gas, thence into and through the cooling zone 14 and out of the reactor through the discharge 18.

Reduction of the ore is effected by means of a reducing gas composed largely of carbon monoxide and hydrogen which is heated in a heater 20 to a temperature of say 750° C. to 1000° C. and then flows through pipe 22 to a plenum chamber 24 formed by an internal circular baffle 26 and the adjacent wall of the reactor. From the plenum chamber 24 the reducing gas flows around the bottom of baffle 26 and thence upwardly through the particulate iron ore in the reduction zone 12 and reduces the ore to sponge iron. Gas leaving the top of the ore bed in the reduction zone leaves the reactor through pipe 28 and flows to a quench cooler 30 wherein it is cooled and de-watered by direct contact with cooling water.

The cooled and de-watered reducing gas leaves the cooler 30 through pipe 32 and is then divided with one portion flowing through pipe 34 to a suitable point of storage or a point of use, e.g., as a fuel gas. The remainder of the reducing gas flowing through pipe 32 passes through pipe 36 to a pump 38 by which it is pumped through pipe 40 back to the heater 20. Thus a substantial proportion of the reducing gas flows in a closed loop comprising the reduction zone 12, pipe 28, cooler 30, pipes 32 and 36, pump 38, pipe 40, heater 20 and pipe 22. As shown in the drawing, pipe 34 is provided with a back pressure regulator 42 for maintaining a desired elevated pressure within the reactor. Make-up reducing gas is supplied to the reducing gas loop from a pipe 44 in a manner more fully described below.

The cooling zone 14, like the reduction zone 12, also forms part of a gas flow loop. Cooling gas enters the bottom of the cooling zone through a pipe 46 and flows into a plenumchamber 48 defined by the wall of the reactor and a frusto-conical internal baffle 50. From plenum 48 the cooling gas flows around the bottom of baffle 50, thence upwardly through the sections 14b and 14a of the cooling zone to a plenum 52 defined by the wall of the reactor and a frusto-conical baffle 54. From plenum 52 the cooling gas flows through pipe 56 to cooler 58 wherein it is cooled and de-watered and thence through pipe 60 to circulating pump 62 by which it is pumped through pipe 64 back to pipe 46.

In accordance with the present invention, the cooling gas fed through pipe 46 to the bottom of the cooling zone is also a reducing gas which resembles the gas fed to the reduction zone 12 in that it contains substantial amounts of carbon monoxide and hydrogen. The cooling loop is fed with a make-up gas which is supplied to the loop from a suitable source through pipe 66 under the control of a flow controller 68. The make-up gas contains a substantial amount of hydrocarbon gas and may be, for example, a gas containing up to about 30% by volume of methane, or coke oven gas, which contains a lesser proportion of methane. In either case the gas entering the bottom of the cooling zone from pipe 46 contains a substantial amount of hydrocarbon.

The cool reducing gas flowing upwardly through the cooling zone 14 performs at least three different functions. Two of these functions are performed in the cooling zones of previously known moving bed reactors, namely, the cooling of the reduced iron ore and carburization of the sponge iron in accordance with the following equation:

$$2CO \rightarrow C + CO_2$$

Under the conditions existing in the cooling zone, most of the carbon formed in the carburization reaction reacts with the sponge iron to form ferric carbide which is distributed through the sponge iron particles leaving the reactor through discharge 18. The discharge sponge iron contains only a relatively small amount of elemental carbon.

In accordance with the present process the cooling zone performs a third function in that it serves to convert hydrocarbon components of the upwardly flowing gas into carbon monoxide and hydrogen in accordance with the following equation:

$$CH_4 + H_2O \rightarrow CO + 3H_2$$

To provide the water to cause this reaction to proceed, steam is fed to the reactor, preferably between the upper section 14a and the lower section 14b of the cooling zone. More particularly, steam is fed from a suitable source through pipe 70 containing flow controller 72 and then through pipe 74 containing shut-off valve 76 to a plenum 78 from which it flows through a circumferential series of openings 80 to the interior of the cooling zone. The steam mixed with the upwardly flowing hydrocarbon-containing gas and reacts therewith in accordance with the above equation. The reaction of the steam and hydrocarbon is catalyzed by the hot sponge iron in the section 14a of the cooling zone, thus substantially increasing the carbon monoxide and hydrogen content of the circulating coolant gas. Desirably a stoichiometric excess of steam is used to inhibit undesired carbon deposition with the reactor. Typically the molar ratio of steam to methane or other hydrocarbon may be in the range 1.0:1 to 1.5:1. Since the reforming reaction is endothermic, the heat of this reaction is withdrawn from the hot sponge iron and helps to cool it.

As indicated in the drawing, the steam supplied through pipe 70 may also be caused to flow through pipe 82 containing shut-off valve 84 to the recycled gas flowing through pipe 46. Thus the steam may be supplied either to the recycled gas 46 or to a point between the sections 14a and 14b of the cooling zone or both.

Since the gas flowing upwardly through the cooling zone is substantially enriched in respect to carbon monoxide and hydrogen, it is useful as a reducing gas in the reduction zone. Accordingly a portion of the recycled gas flowing through the cooling loop is withdrawn therefrom through pipe 86 containing flow controller 88 and thence flows through pipe 44 as make-up gas to the reducing gas loop.

From the foregoing description it should be apparent that the present invention provides a process capable of achieving the several objects of the invention set forth above. Thus it provides a novel and exceptionally efficient method of reforming a gas consisting of or containing a substantial proportion of hydrocarbon constituents, e.g., coke oven gas or other gas containing up to 30% by volume of hydrocarbon, to upgrade the reducing effectiveness of such a gas. Moreover, the upgrading of the gas is achieved without using a separate catalytic gas reformer which, as pointed out above, involves a substantial capital expenditure. Thus an exceptionally efficient reduction system is provided.

It is of course to be understood that the foregoing description is intended to be illustrative only and that numerous changes can be made in the structure of the system described and its operating conditions without departing from the spirit of the invention as defined in the appended claims.

We claim:

1. The method of reducing particulate iron ore to sponge iron particles in a vertical moving bed reactor having a reduction zone in the upper part thereof in which a hot reducing gas is caused to flow through a portion of said bed to reduce iron ore thereof to sponge iron and having a cooling zone in the lower part of said reactor for cooling said sponge iron, which comprises feeding a carbon-containing cooling gas to a point near one end of said cooling zone to cause said gas to flow through said cooling zone in contact with sponge iron therein and carburize it, removing said cooling gas at a point near the other end of said cooling zone, cooling the removed gas, recirculating the cooled gas to said cooling zone to form a closed cooling gas loop, adding to said loop as make-up a gas containing a substantial amount of gaseous hydrocarbon, adding steam to said cooling zone at a point between said one end and said other end thereof to cause said steam and gaseous hydrocarbon to react within said cooling zone to form carbon monoxide and hydrogen and using a portion of the gas from said loop to reduce iron ore in said reduction zone.

2. A method according to claim 1 wherein the make-up gas contains up to about 30% by volume of gaseous hydrocarbon.

3. A method according to claim 2 wherein the gaseous hyrocarbon is methane.

4. The method of reducing particulate iron ore to sponge iron particles in a vertical moving bed reactor having a reduction zone in the upper part thereof in which a hot reducing gas is caused to flow through a portion of said bed to reduce iron ore thereof to sponge iron and having a cooling zone in the lower part of said reactor for cooling said sponge iron, which comprises feeding a carbon-containing cooling gas to a point near the bottom of said cooling zone to cause said gas to flow upwardly in contact with sponge iron therein and carburize it, removing cooling gas near the top of said cooling zone, cooling the removed gas, recirculating the cooled gas to said cooling zone to form a closed cooling gas loop, adding to said loop as make-up a gas containing a substantial amount of gaseous hydrocarbon, adding steam to said cooling loop to cause said steam and gaseous hydrocarbon to react within said cooling zone to form carbon monoxide and hydrogen, withdrawing a stream of gas from said cooling loop, heating the withdrawn stream of gas and feeding the withdrawn stream to said reduction zone to reduce iron ore therein.

5. A method according to claim 4 wherein the make-up gas contains up to about 30% by volume of gaseous hydrocarbon and a stoichiometric excess of steam is used.

6. A method according to claim 4 wherein the sponge iron is carburized in the lower portion of said cooling zone and the added steam and gaseous hydrocarbon react to form carbon monoxide and hydrogen in the upper portion of said cooling zone.

7. A method according to claim 4 and wherein the withdrawn stream of gas is removed from the loop after the circulating gas is cooled and before make-up gas and steam are added thereto.

8. A method according to claim 4 wherein the steam is added to the gas circulating in the cooling loop at a point downstream of the cooling zone outlet and upstream of the point at which make-up gas is added to the circulating gas.

9. A method according to claim 4 wherein the steam is added to the gas circulating in the cooling loop at a point downstream of the point at which make-up gas is added and upstream of the point at which effluent gas from the cooling zone is cooled.

10. A method according to claim 4 wherein steam is added directly to the cooling zone.

11. A method according to claim 10 wherein the steam is added to the cooling zone near the midpoint thereof.

12. A method according to claim 4 wherein the withdrawn gas stream is the sole source of reducing gas for the reduction zone of said reactor.

13. A method according to claim 4 wherein said reduction zone forms part of a reducing gas loop including a cooler for cooling gas withdrawn from said reduction zone, a pump for circulating gas within said reducing gas loop and a heater for reheating the circulating gas, and said withdrawn stream of gas is fed to said loop.

14. A method according to claim 13 and wherein said withdrawn gas stream is fed to said loop at a point between said pump and said heater and spent reducing gas is withdrawn from said loop at a point between said cooler and said pump.

15. A method according to claim 4 wherein said make-up gas is coke oven gas.

16. A method according to claim 4 and wherein the molar ratio of steam to gaseous hydrocarbon is from 1.0:1 to 1.5:1.

17. The method of reducing particulate iron ore to sponge iron particles in a vertical moving bed reactor having a reduction zone in the upper part thereof in which a hot reducing gas is caused to flow through a portion of said bed to reduce iron ore thereof to sponge iron and having a cooling zone in the lower part of said reactor for cooling said sponge iron, which comprises feeding a carbon-containing cooling gas to a point near one end of said cooling zone to cause said gas to flow through said cooling zone in contact with sponge iron therein and carburize it, removing said cooling gas at a point near the other end of said cooling zone, cooling the removed gas, recirculating the cooled gas to said cooling zone to form a closed cooling gas loop, adding to said loop as make-up a gas containing a substantial amount of gaseous hydrocarbon, adding steam to said loop in an amount sufficient to provide a molar steam/hydrocarbon gas ratio of at least 1:1 to cause said steam and gaseous hydrocarbon to react within said cooling zone to form carbon monoxide and hydrogen and using a portion of the gas from said loop to reduce iron ore in said reduction zone.

18. The method of reducing particulate iron ore to sponge iron particles in a vertical moving bed reactor having a reduction zone in the upper part thereof in which a hot reducing gas is caused to flow through a portion of said bed to reduce iron ore thereof to sponge iron and having a cooling zone in the lower part of said reactor for cooling said sponge iron, which comprises feeding a carbon-containing cooling gas to a point near one end of said cooling zone to cause said gas to flow through said cooling zone in contact with sponge iron therein and carburize it, removing said cooling gas at a point near the other end of said cooling zone, cooling the removed gas, recirculating the cooled gas to said cooling zone to form a closed cooling gas loop, adding coke oven gas to said loop as make-up, adding steam to said loop to cause said steam and coke oven gas to react within said cooling zone to form carbon monoxide and hydrogen and using a portion of the gas from said loop to reduce iron ore in said reduction zone.

* * * * *